United States Patent [19]

Heide et al.

[11] Patent Number: 4,460,078

[45] Date of Patent: Jul. 17, 1984

[54] TORQUE RELEASE CLUTCH

[76] Inventors: Charles H. Heide, 5825 -6th Pl., Kenosha, Wis. 53142; Edward S. Hanson, 3408 N. Green Bay Rd., Racine, Wis. 53404

[21] Appl. No.: 329,249

[22] Filed: Dec. 10, 1981

[51] Int. Cl.³ .................... F16D 43/20; F16D 43/21; F16D 11/06; F16D 7/02

[52] U.S. Cl. .................... 192/56 R; 192/71; 192/79; 192/93 A; 192/114 R; 464/35

[58] Field of Search .................... 192/56 R, 79, 93 A, 192/114 R, 71; 464/35, 30, 82, 139; 81/467

[56] References Cited

U.S. PATENT DOCUMENTS

| | | | |
|---|---|---|---|
| 1,102,427 | 7/1914 | Morgan | 192/71 X |
| 2,098,785 | 11/1937 | Mathewson | 464/35 X |
| 2,474,789 | 6/1949 | Perhacs | 192/71 X |
| 2,637,987 | 5/1953 | Hill et al. | 464/35 X |
| 3,877,253 | 4/1975 | Yeagle | 464/35 |

FOREIGN PATENT DOCUMENTS

| | | | |
|---|---|---|---|
| 783506 | 11/1980 | U.S.S.R. | 464/35 |
| 872845 | 10/1981 | U.S.S.R. | 464/35 |

*Primary Examiner*—Rodney H. Bonck
*Assistant Examiner*—David D. House

[57] ABSTRACT

A system for transmitting motion between a driving component and a driven component includes a torque release clutch for transmitting motion between the components until a predetermined amount of force is required to do so, whereupon the clutch releases. The clutch includes a pair of relatively movable members, at least one ball, and an expandable ring. The ball has one position wherein the ball is in engaged or interfering relationship between the pair of members whereby movement of one member effects movement of the other member. The ball has another position wherein the ball is out of interfering relationship with or disengaged from at least one movable member. The expandable ring is mounted on one of the movable members and is engageable with the ball to hold the ball in engaged position until a force applied to the ball exceeds a predetermined amount, whereupon the ring is forced to expand and allow the ball to move to the disengaged position. A resetting mechanism is provided to move the ball back to the engaged position.

8 Claims, 5 Drawing Figures

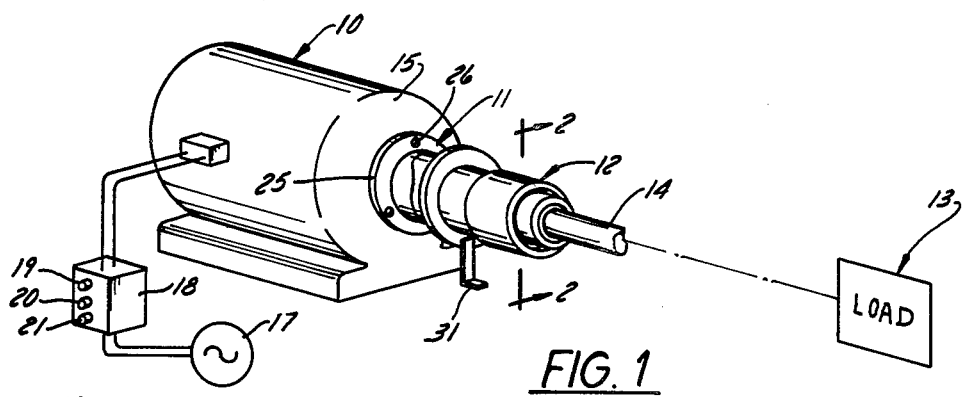
FIG. 1
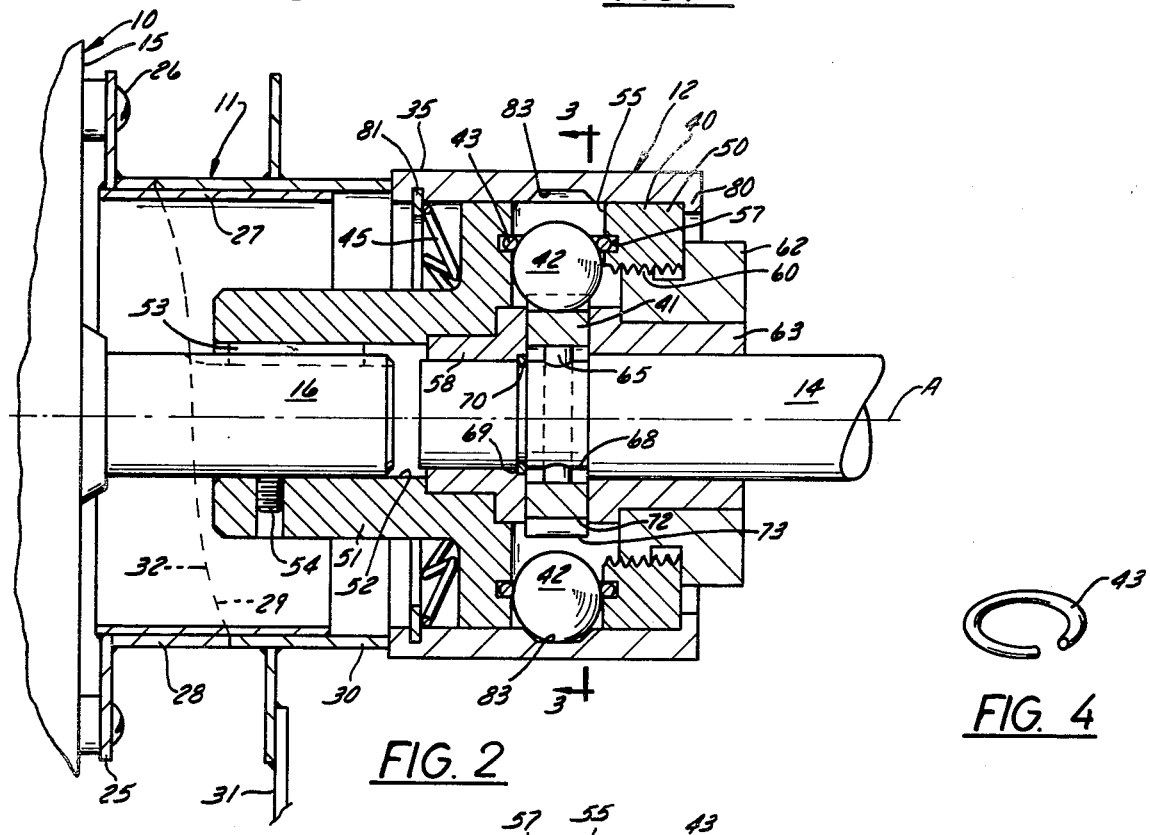
FIG. 2
FIG. 4
FIG. 3

TORQUE RELEASE CLUTCH

BACKGROUND OF THE INVENTION

1. Field of Use

This invention relates to releasable clutches used in systems wherein motion is transmitted between two components, which clutches change from engaged to disengaged condition when a predetermined force or torque is required to transmit such motion.

2. Description of the Prior Art

Clutches of the aforesaid character are known and are sometimes referred to as "torque release" or "overload release" clutches or couplings. The prior art disclosing such clutches is very extensive. Such torque release clutches or couplings take various forms and are typically designed to meet the needs and/or design limitations imposed by motion transmission systems wherein they are employed.

SUMMARY OF THE INVENTION

In accordance with the present invention there are provided improved torque release clutches or couplings for use in systems wherein motion is transmitted between a driving component and a driven component. Broadly considered, clutches or couplings in accordance with the invention comprise a pair of relatively movable members, at least one ball, and an expandable ring mounted on one of the movable members and engageable with the ball. The ring operates to hold the ball in one (engaged) position wherein the ball is in engaged or interfering relationship between the pair of members whereby movement of one member effects movement of the other member. The ring is expandable to allow the ball to pass therethrough and move from said one (engaged) position to another (disengaged) position wherein it is out of engagement with at least one of the movable members so that motion cannot be transmitted between the members. The ring is forced to expand and allow ball passage therethrough in response to force imposed on the ring by the ball, which force is imposed on the ball by the movable members. The amount of force required to effect ring expansion is determined, among other things, by the resiliency of the ring relative to other factors such as ring size, ball size, number of balls and rings employed. Preferably, the system includes resetting means to move the ball from the disengaged position back to the engaged position.

In a first embodiment of the invention disclosed herein one of the relatively movable members of the clutch takes the form of a rotatable sprocket wheel and its teeth engage a plurality of balls which are radially arranged therearound in holes in the inner surface in a hollow cylindrical ball cage. Each ball is associated with an expandable ring mounted in a hole in the ball cage. In moving from engaged to disengaged position (or vice-versa), each ball moves in a path which is transverse to and radially disposed to the circular path in which the ball moves while transmitting motion. The resetting means includes a spring-biased shiftably movable reset ring surrounding the ball cage and a mechanism including a lever, for shiftably moving the reset ring.

Torque release clutches in accordance with the present invention provide numerous advantages over the prior art. For example, the shiftable ball and expandable ring associated therewith lend themselves to a wide variety of particular arrangements and enable the design of many types of overall clutch arrangements, best suited for particular systems. Furthermore, adding to or subtracting from the number of balls used in a particular clutch enables immediate change or adjustment in the amount of force or torque required to effect overload release. The use of balls as the operative elements in the clutch ensures smooth and reliable operation and reduces wear and tear on the clutch thereby extending its life. The clutch readily lends itself to application in systems wherein rotary motion is transmitted between axially aligned shafts, or between axially offset shafts. The clutch is also adaptable for use in tools, such as torque wrenches, wherein when the force or torque applied to the tool handle exceeds that which should be applied to a bolt being driven by the socket wrench, the handle is operatively disengaged from driving the socket wrench.

Other objects and advantages will hereinafter appear.

DRAWINGS

FIG. 1 is a perspective view of a system including an electric motor, a load connected thereto by a releasable clutch in accordance with the present invention, and a resetting mechanism;

FIG. 2 is a greatly enlarged cross section view of the clutch and resetting mechanism taken on line 2—2 of FIG. 1 showing different portions of the clutch engaged and disengaged;

FIG. 3 is a cross section view taken on line 3—3 of FIG. 2;

FIG. 4 is a perspective view of a split ring used in the clutch of FIGS. 1, 2 and 3;

DESCRIPTION OF PREFERRED EMBODIMENT

Figure 5:
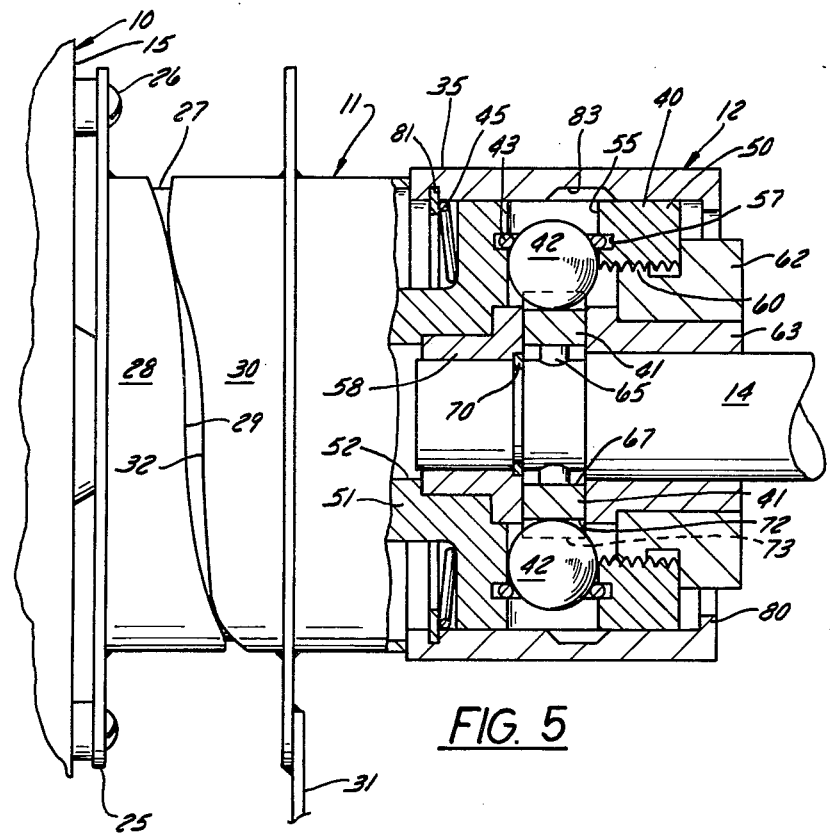
FIG. 5 is a cross section view of the clutch of FIGS. 1, 2 and 3 just after being re-engaged.

Referring to FIGS. 1, 2, 3, 4 and 5, there is shown a system for transmitting rotary motion from an electrical motor 10, through a releasable clutch 12 in accordance with the invention, to a rotatable load 13 which is connected to a rotatable shaft or driven element 14.

Motor 10 includes a housing 15 and a rotatable shaft or driving element 16 and is supplied with electric power from an AC power source 17, for example, through an electric control switch 18 which includes an "off" pushbutton 19, an "on" pushbutton 20, and a "jog" pushbutton 21.

A clutch resetting means in the form of a reset mechanism 11 is provided and is mounted on motor 10 in operative association with clutch 12. Reset mechanism 11 comprises a stationary plate 25 which is secured to motor housing 15 by screws 26 and from which a stationary hollow inner sleeve 27 extends. A stationary hollow outer sleeve 28 is rigidly mounted on inner sleeve 27 and includes a curved cam edge 29. Reset mechanism 11 further comprises a rotatable hollow outer sleeve 30 which is rotatably movable a short distance on sleeve 27 by means of a handle 31 and which is provided with a curved cam edge 32. As sleeve 30 is rotated by handle 31, the curved edges 29 and 32 cooperatively engage and sleeve 30 is shifted axially on inner sleeve 27 into engagement with a reset ring 35 on clutch 12, as hereinafter described in detail, to effect resetting of the clutch, whereupon sleeve 30 is returned to its normal position. If preferred, instead of a manually operable reset mechanism 11, the reset means for effecting shifting movement of reset ring 35 could take some other form (not shown) such as: a pneumatic, or hydraulic, or electric actuator.

Clutch 12 generally comprises a pair of relatively movable members, such as a ball cage 40 and a sprocket 41; a plurality of force-transmitting members or balls 42; a plurality of expandable rings 43, one for each ball 42, mounted on ball cage 40 and engaged with the balls 42; reset ring 35 hereinbefore referred to; and a biasing spring 45.

Ball cage 40 comprises an annular portion 50 and a hollow cylindrical portion 51 extending from one side thereof. Portion 51 includes a bore 52 for accommodating motor shaft 16 which is secured therein by a key 53 and a set screw 54 in a conventional manner. Annular portion 50 of cage 40 comprises a plurality (eight shown) of ball-receiving holes or bores 55. Each hole 55 is cylindrical and its longitudinal axis intersects and is normal to the longitudinal axis of cage 40. Each hole 55 is provided with an annular ring-receiving groove 57 formed intermediate its ends. A bushing 58 is press-fitted (or otherwise secured) in bore 52 of portion 51 of ball cage 40 and has a portion which slightly overlies the ball-receiving holes 55 to thereby prevent the balls 42 from falling out of the holes 55.

The inner surface of annular portion 50 of cage 40 is threaded as at 60 and receives a hollow threaded bushing 62 which screws thereinto. Bushing 62 is provided with a bushing 63 which is press-fitted (or otherwise secured) thereto. Bushing 63 serves as an anti-friction bearing surface for shaft 14 which is rotatable therein and connected to sprocket 41 by a pin 65. Pin 65 extends through a transverse pin hole 66 in shaft 14 and its ends extend into recesses 67 formed in sprocket 41 adjacent to bore 68 in the sprocket. A shoulder 69 and a snap-ring 70 on shaft 14 position and secure sprocket 41 thereon. Bushings 62,63 & bushing 58 also define a space in which sprocket 41 is supported for steady rotation.

The reset ring 35 is a hollow cylindrical member having an annular shoulder 80 at one end and an internally positioned snap-ring 81 at its outer end whereby it is mounted for axially shiftable movement and relative rotation on the exterior of ball cage 40. Ring 35 is provided on its inner surface with a ball-engaging groove 83. Ring 35 is normally biased into the position shown in FIG. 2 (wherein groove 83 is centered or aligned with the balls 42) by the biasing spring 45 which is entrapped between snap ring 81 and the side of ball-cage 40. Ring 35 operates to retain the balls 42 in the holes 55 when the balls have passed through the rings 43 and are in the disengaged position. Ring 35 is also shiftable against the bias of the spring 45 by means of the reset means, hereinbefore described, to move the balls 42 from the disengaged to engaged position (compare the lower portions of FIGS. 2 and 5) as the edge of groove 83 engages the balls and forces them back through the rings 43.

Sprocket 41 preferably contains as many ball-receiving indentations 72 and ball-engaging projections 73 as there are ball-receiving holes 55 in ball cage 40. As FIG. 3 shows, the balls 42 may all be in the clutch-engaged position (as shown above a line A in FIG. 3) or may all be in the clutch-released position (as shown below the said line A). FIG. 2 similarly shows an upper ball 42 engaged with and a lower ball 42 disengaged from sprocket 41. It is to be understood, however, that all balls are normally in one or the other position.

Each ball 42 is held in engaged position in an indentation 72 in the sprocket by its expandable ring 43 when the latter is in relaxed condition wherein the spring diameter is some dimension smaller than the diameter of the ball 42.

When the balls 42 are in the engaged position, rotation of ball cage 40 effected by motor shaft 16 carries the balls with it and the balls bear against the projections 73 of sprocket 41 causing the sprocket and its shaft 14 to rotate. However, if the force imposed on the balls 42 by the projections 73 of sprocket 41 in response to an increase in the load 13 equals the force required to cause the rings 43 to expand sufficiently to allow the balls 42 to pass therethrough, then the balls are snapped through the rings 43 as they move from the engaged to the disengaged position and clutch 12 becomes disengaged. The clutch 12 remains disengaged until reset ring 35 and the reset means therefor are operated as hereinbefore described.

We claim:

1. A clutch for use between a driving component and a driven component comprising:
   a pair of relatively movable members;
   at least one ball having one position wherein it is in force-transmitting relationship between said members and having another position wherein it is out of engagement with at least one of said members;
   and an expansion ring mounted on one of said members and engageable with said ball, said ring being operable when relaxed to maintain said ball in said one position, said ring being further operable to expand and allow passage of said ball therethrough to said other position when the force imposed on said ball by said members is sufficient to enable said ball to force said ring to expand.

2. A clutch according to claim 1 including reset means to return said ball from said other position to said one position.

3. A clutch according to claim 1 or 2 comprising a plurality of said balls and a plurality of said rings, one for each ball.

4. A clutch according to claim 3 wherein said relatively movable members are both rotatable about a common axis, wherein said balls are mounted on one member and radially arranged around said axis, and wherein the other member comprises abutments engageable with said balls when the latter are in said one position.

5. A clutch according to claim 4 wherein said one member on which said balls are mounted includes holes in which said balls are located and in which said rings are expandably supported.

6. A clutch according to claim 5 wherein the axis of each hole intersects and is normal to said common axis.

7. A clutch according to claim 6 wherein said reset means comprises a reset ring which surrounds said one member on which said balls are mounted, which reset ring is axially shiftable to engage said balls and return them to their said one position.

8. A clutch according to claim 7 wherein said other member takes the form of a sprocket and said abutments take the form of sprocket teeth.

* * * * *